United States Patent [19]
Daver

[11] Patent Number: 5,513,854
[45] Date of Patent: May 7, 1996

[54] SYSTEM USED FOR REAL TIME ACQUISTION OF DATA PERTAINING TO PERSONS IN MOTION

[76] Inventor: Gil J. G. Daver, 822 Route de Cabris, Speracedes, France, 06530

[21] Appl. No.: 232,484

[22] Filed: Apr. 25, 1994

Related U.S. Application Data

[63] Continuation-in-part of Ser. No. 49,840, Apr. 19, 1993, abandoned.

[51] Int. Cl.$^6$ ....................................................... A63B 69/00
[52] U.S. Cl. ........................... 273/454; 273/411; 273/439
[58] Field of Search ..................... 273/58 G, 31, 273/411, 213, 32 H, 454, 411, 439

[56] References Cited

U.S. PATENT DOCUMENTS

| | | | |
|---|---|---|---|
| 3,782,730 | 1/1974 | Horchler | 273/213 |
| 3,898,692 | 2/1975 | Woodard et al. | 273/213 X |
| 4,660,039 | 4/1987 | Barricks et al. | 273/213 X |
| 5,056,106 | 10/1991 | Wang et al. | 273/213 X |

*Primary Examiner*—William H. Grieb
*Attorney, Agent, or Firm*—Moore & Hansen

[57] ABSTRACT

This system, used to acquire and process in real time data pertaining to the position and/or physical performances of one or several persons in motion on a field, in particular athletes in motion on a game field, includes:

a) devices used for a real time acquisition of the individual instantaneous positions of every person on the field;

b) digital processing devices associated with said acquisition devices in order to determine a set of digital Values which are representative of the physical performance of said persons based on said instantaneous position information;

c) interface devices connected to said digital processing devices responsible for preparing digital Values which are representative of the physical performances as well as for their graphic representation.

The purpose of the invention is the tracking of athletes and of a ball on a game field.

9 Claims, 6 Drawing Sheets

SYSTEM USED FOR REAL TIME ACQUISTION OF DATA PERTAINING TO PERSONS IN MOTION

This application is a continuation-in-part of U.S. application Ser. No. 08/049,840, filed Apr. 19, 1993, abandoned.

FIELD OF THE PRESENT INVENTION

The present invention pertains to a system used for real time acquisition and processing of the positions and/or physical performances of one or several persons in motion on a field, notably athletes in motion on a game field.

BACKGROUND OF THE PRESENT INVENTION

For some time now, one has attempted to analyze the movements as well as the physical and energy related performances of athletes in motion on a game field. For this purpose, sets of statistical data have been developed which are correlated with medical or physiological data pertaining to athletes, or used for data representation purposes. The usefulness of making real time use of graphic representations of the performances of athletes in order to increase their competitiveness, for educational purposes, or to enhance television broadcasts of sports events is clear, but currently available technology is not capable of providing representations of this type in real time.

The determination of sports related performances of a group of players implies, among others, the problems of determining their respective positions at every instant and, if applicable, the position of the ball on the field as well as the problem of processing the various position related data in order to extract information which is useful to the public and/or the athletes themselves.

Generally speaking, using currently existing technology, the acquisition of sports related performance data (the number of strides, the number of aces scored in tennis, etc.) is handled in a very primitive manner, usually by hand and in time-delayed fashion or otherwise under conditions which have little in common with real world situations, as has been the case of tests carried out in a medical environment.

Furthermore, non-manual acquisition techniques and devices have until now been limited to sports where the efforts are individual without it ever being possible to automatically track, in real time, the positions and the performances of a number of athletes simultaneously in motion on a playing field.

More specifically, in the context of currently existing technology, one is aware of apparatuses and processes aimed at determining the position of a ball on a playing field. Such a process is described in French Patent 2 636 742, whereby one locates an object in motion, i.e., a golf ball, using radio or radar in order to control cameras used for television broadcasts.

However, using a system of this type, it is not possible either to follow the movements of a set of players in real time or to instantly develop a set of statistics which describe the individual performances of each of the players.

It is for this reason that systems known for games which make use of a ball do not allow for automatic real time acquisition and processing of position-related information pertaining to persons in motion on a field. In order to evaluate the performances of these persons, said known systems require manual entry of game events using specific keyboards, the use of the data that was entered to build schedules, statistics or others, which in turn would be used for educational purposes or television broadcasts.

SUMMARY OF THE PRESENT INVENTION

Given currently existing technology, the purpose of the invention is to provide a system which makes it possible to solve the problems encountered with existing technology and, generally speaking, to automate the acquisition of sports related statistics in real time and to generalize their use either in real time or in a time-delayed fashion.

The purpose of the invention, in particular, is to propose a process and a hardware system which are capable of real time analysis of the physical performances of either one or a number of athletes in motion on a game field, allowing real time automatic acquisition of a multitude of parameters which describe the physical activity of these athletes as well as a graphical representation of said parameters.

For this purpose, the invention covers both a process and a hardware system which are used to acquire and process data pertaining to one or several persons in motion on a field, in particular athletes in motion on a game field, and is characterized by the fact that it includes:

a) devices for individual real time acquisition of the instantaneous position of every person on the game field;

b) digital processing devices associated with said acquisition devices used to determine a set of digital Values which represent the physical performance of said persons, using said information of instantaneous position;

c) interface devices connected to said digital processing devices responsible for preparing the digital Values which represent the physical performances and for their graphic representation.

The invented system has, furthermore, the following characteristics:

It includes devices which acquire and process the instantaneous position of an object, in particular that of a ball on a game field, and said devices are linked to the devices which acquire and process the instantaneous position of the athletes so as to develop a set of digital Values which represent the interaction between said athletes and said ball.

Said devices which acquire the instantaneous position of an object are made up of shape-recognizing digital video devices; the exact instantaneous position of the object being determined through the identification of said object at a particular location in the field where, using moving object tracking techniques, it has been determined that the object is located.

Said devices for individual real time acquisition of the instantaneous position of every person on the game field include, on the one hand, miniaturized radio frequency transmitters carried by said persons and, on the other hand, a set of no less than three radio frequency goniometric receivers which are tuned to the frequency of each of said transmitters so as to detect, several times per second, the instantaneous position of each transmitter on the field by triangulating the directions from which each of the transmitters transmits.

Said digital video acquisition devices include a set of at least two fixed digital constant focal length cameras aimed in the direction of the field and arranged so that their optical axes are clearly perpendicular to each other; the digital output of each camera being connected to the input of electronic cards which store the instantaneous digital image as well as the image which immediately precedes it; the output of each said cards being connected to a module which subtracts said instantaneous digital image and said digital image which immediately precedes it; the respective outputs of each image subtraction module being connected to the input of respective moving object tracking and shape recognition modules; the outputs of each said moving object tracking and shape recognition module being connected to a module which calculates the trajectory of the object within a fixed reference that is associated with the field.

Said interface devices include a multimedia computer which includes, among others, a central processing unit, a connection bus between said central processing unit and said digital processing and digital video processing devices, a display monitor of said digital Values as well as sound devices for messages associated with said digital Values.

Said multimedia computer includes, among others, memory devices used to store the screen display models which correspond to a multitude of contexts for uses and sports as well as devices used to make selections in said memory among said multitude of contexts in order to configure the system in function of a particular context.

Said multimedia computer contains devices for the control and management of the goniometric receivers and of the digital video cameras around the field, devices to manage and edit a set of parameters which are associated with each team and/or associated with every member of a team present on the field as well as devices used to prepare and display synthetic images which represent a bird's-eye view of the field, of the athletes, of their movements and of their performances.

The process in accordance with the invention is characterized by the fact that it includes several steps which consist of:

a) initializing the system by assigning both a transmitter device to every player in the field and at least three corresponding goniometric receivers and by assigning a pair of digital video cameras to the ball in order to determine the instantaneous positions of said players and of said ball;

b) generating a sequence of successive images which, respectively, represent the instantaneous positions of every player and/or of the ball on the field in bird's-eye view;

c) memorizing said sequences in storage devices which are associated with the processing devices;

d) using said processing devices to filter said sequences in order to obtain, based on the position data, data pertaining to the trajectory of every player and/or ball over time.

e) calculating in real time and several times per second, based on the position and trajectory data, a set of representative values and/or statistics regarding the performances of every player;

f) visualizing said values and/or statistics.

BRIEF SUMMARY OF THE DRAWINGS

Other characteristics and benefits of the system as invented become clearer in the context of the following description, provided for illustration purposes, without being limiting in any way.

DETAILED DESCRIPTION OF THE PRESENT INVENTION

What follows is a particular implementation of the invention provided for illustration purposes, without being limited in any way, for use in a sports related context, in particular in the context of a sports field containing a number of players and a ball. It is understood that variations of the invention may be used in fields which are unrelated to sports while remaining within the context of the invention.

Figure 1:
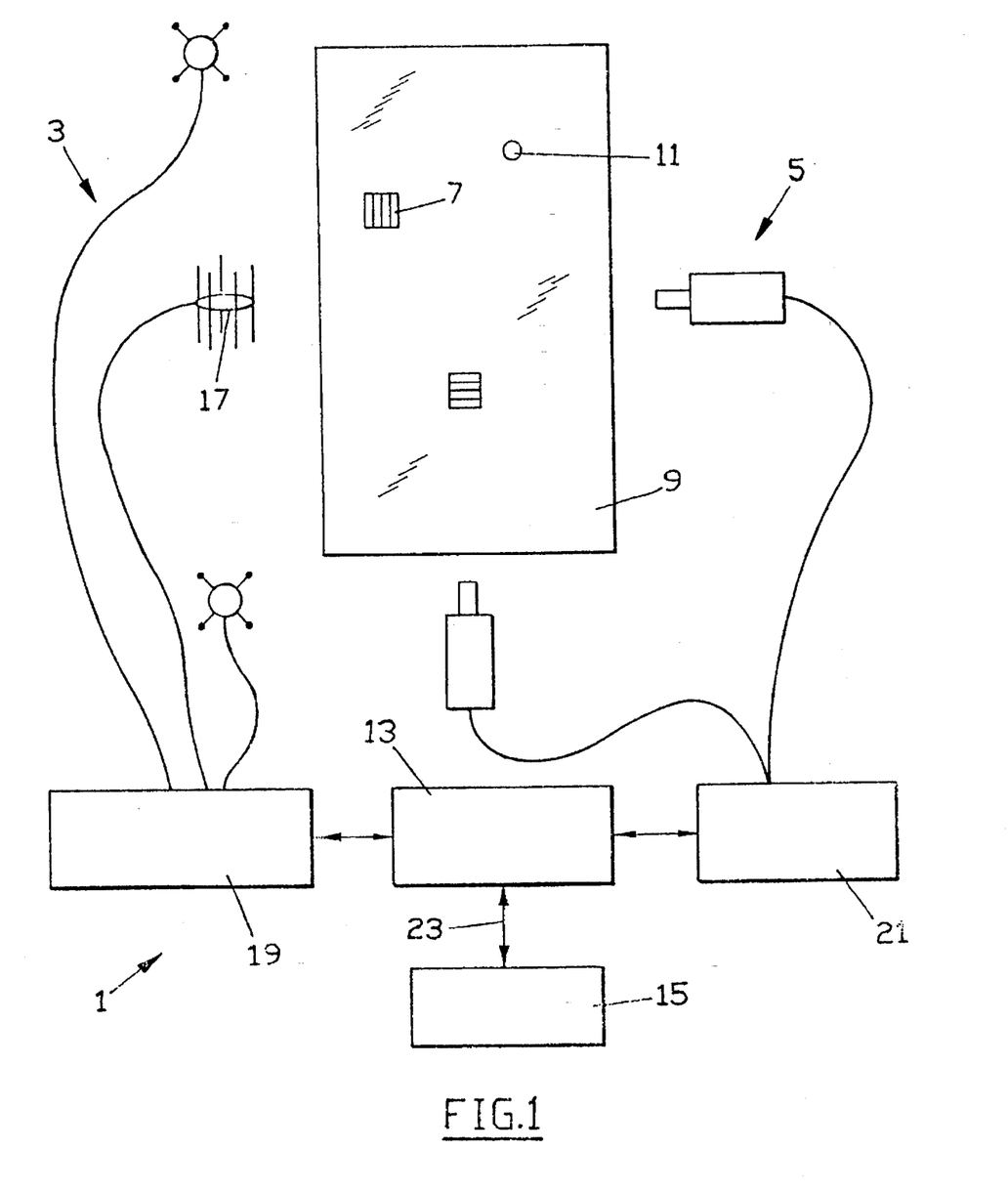
FIG. 1 represents a general plane section illustrating a sports field equipped with the main components of the system as invented.

FIG. 1. The acquisition and processing system 1 mainly consists of acquisition devices 3, 5 which, respectively, are used for detecting and acquiring the instantaneous position of every player 7 on a game field 9 as well as of the instantaneous position of the ball 11; of devices 13 used for digitally processing the position data, and of interface devices 15 responsible for both preparing the respective digital Values which are representative of the physical performances and for their graphic representation. The acquisition devices 3 used to acquire the position of the players consist of, on the one hand, a set of miniaturized radio frequency transmitters (not illustrated) which are carried by the players, and on the other hand, of a set of radio frequency antennas 17 which are responsible for receiving the radio signals from the transmitters. The different radio signals which are received are processed by goniometric receivers 19 which determine the directions from which the transmitters transmit; the digital processing devices 13 making use of known triangulation methods to determine the position of a transmitting mobile object based on the direction of several signals received by the goniometric receivers 19.

The transmitters carried by the players are of a conventional type and small enough to be easily integrated into a piece of equipment of said players, i.e., their shorts or a belt buckle. Every transmitter transmits a common radio frequency carrier within the 223.5 Mhz or 2.4 Ghz bands; the different carriers being separated by 25 Khz frequency bands as is current practice in radio transmissions.

The central acquisition unit 13 contains a series of microprocessor equipped cards. Every card is capable of processing the positions of several transmitters. At least three goniometric receivers 19 are necessary to locate a transmitter of a given frequency. These goniometric receivers are positioned around the field so as to ensure that every radio transmitter is continuously detected and localized by no less than three different goniometric receivers 19. The principle behind these goniometric receivers is known, notably in the context of goniometric detection systems used for off-shore rescue missions.

The actual digital processing of the position data obtained for every player is handled by a central electronic acquisition unit 13 which, as input, uses the instantaneous transmission directions which are supplied by each of the goniometric receivers. Based on the transmission directions supplied by the different goniometric receivers 19 assigned to players 7, the central acquisition unit 13 determines the instantaneous positions of the players by means of triangulation. Electronic units 13 of this type are known in themselves and will therefore not be described in further detail. One should note that the accuracy of the instantaneous positions depends on the number of processing cycles which can be carried out per second, especially when the speed of movement of the players is high. Hence, the goniometric receivers 19 are selected on the basis of their ability to sample and process the signals coming from every antenna 17 at least five times per second which corresponds to an acquisition frequency of at least five Hertz.

Preferably, system 1 also contains devices responsible for acquiring and processing the instantaneous position of an object on the field, a ball in particular. These devices are possibly at least two fixed digital constant focal length cameras 5 aimed in the direction of the field and arranged so that their optical axes are clearly perpendicular to each other. The digital output of each camera 5 is connected to the input of an electronic card 21 which stores the instantaneous digital image as well as the image which immediately precedes it. Such digital video acquisition cards are already known and are used, for example, in the field of robotics for shape recognition with the assistance of moving-object tracking techniques which are also known. As explained in more detail in the context of FIG. 4, the output of said electronic card 21 is connected to a module which calculates the successive instantaneous coordinates (or trajectory) of the object within a fixed reference associated with the field. This calculation module is preferably incorporated in the central electronic acquisition unit 13. In this manner, based on the data pertaining to the position of the players and of the ball over time, unit 13, using a filtering process (to avoid inaccuracies caused by individual position calculations), creates a digital image of the trajectory of each player as a function of time. Using the position data transmitted by acquisition unit 13 over a bus 23, a computer 15, using specific conventional calculation programs, is also able to calculate a number of statistics which describe game or individual performance parameters such as, for example; the instantaneous speed of every player, his acceleration, his expenditures in energy (based on distances traveled and individual physiological data preloaded in the working memory of acquisition unit 13), ball related game statistics, etc.

The acquisition of position data is continuous, and specific inquiries regarding a specific parameter are made by the user by means of a computer 15 connected to the electronic acquisition unit 13 responsible for providing an interface between the acquisition center 13 and the user, in particular for the configuration of system 1 and for in the event that a player is changed. The multimedia computer, in known fashion, includes a certain number of components (not illustrated), among which a central processing unit, a monitor displaying the digital Values that were calculated as well as audio devices for messages associated with said digital Values such as, for example, synthesized audio messages describing the configuration help screens.

The multimedia computer contains, among others, memory devices used to store screen display models which correspond to the multitude of possible utilization contexts or sports as well as menu driven selection devices which make it possible, from among said multitude of contexts, to configure the system in function of a particular context such as the context of a football game, for example.

The multimedia computer contains, among others, devices used to control and manage the position of the goniometric receivers and of the digital video cameras around the field in function of the context that was selected; devices used to manage and edit a set of parameters pertaining to each team and/or each athlete who belongs to one of the teams present on the field; and devices used to prepare and display synthetic images which represent a bird's-eye view of the field, the athletes, their movements and their performances as well as the ball. These synthetic images are obtained by having graphic symbols representing the ball and the players move on the monitor of the multimedia computer; the movements of said graphic symbols being slaved to the actual movements of the ball and the players as detected by the position acquisition devices.

Figure 2:
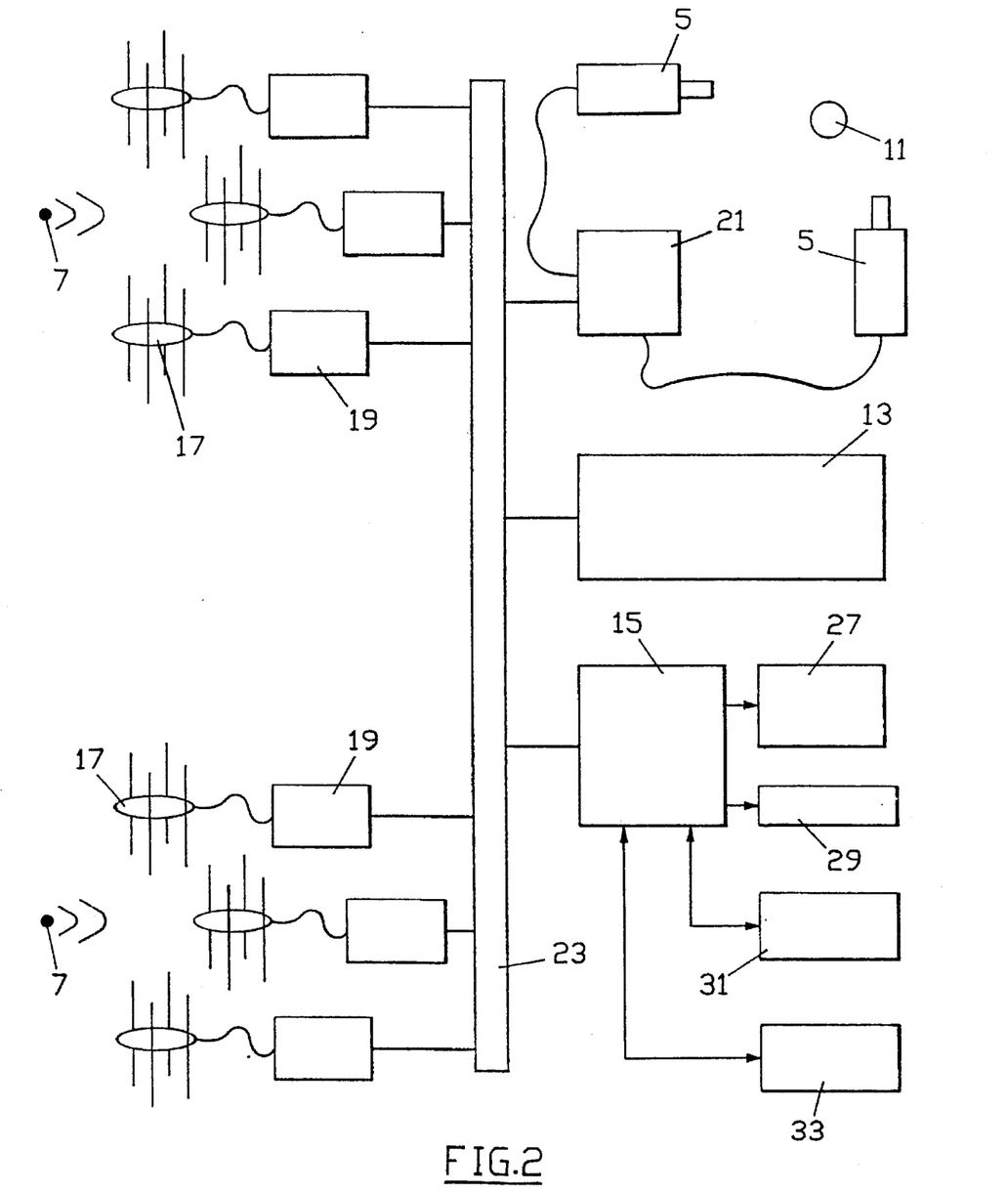
FIG. 2 represents a schematic of the principle of the system shown in FIG. 1.

FIG. 2 provides additional details of the elements which make up system 1, as invented. The illustration contains only two localization systems for two separate players, each system being made up of three goniometric receivers 19 with antennas 17, and each goniometric receiver 19 containing a system which determines the direction from which the corresponding transmitter transmits. The different goniometric receivers 19 used to calculate positions are connected to dialog bus 23 which, in turn, is connected to acquisition unit 13 (FIG. 1). Connected to said dialog bus one will also find card 21 responsible for digitally processing the digital images generated by the digital video cameras 5 which determine the position of a ball. Finally, dialog bus 23 is also connected to the multimedia computer 15. The latter includes peripherals which are used to communicate with the user of the system—monitor 27, keyboard and mouse (or other pointing device) 29—and it is also connected to a video device 31 and a network interface 33 for remote operation of system 1 as invented. All of these components are well known as technology stands today and will therefore not be described in further detail.

Figure 3:
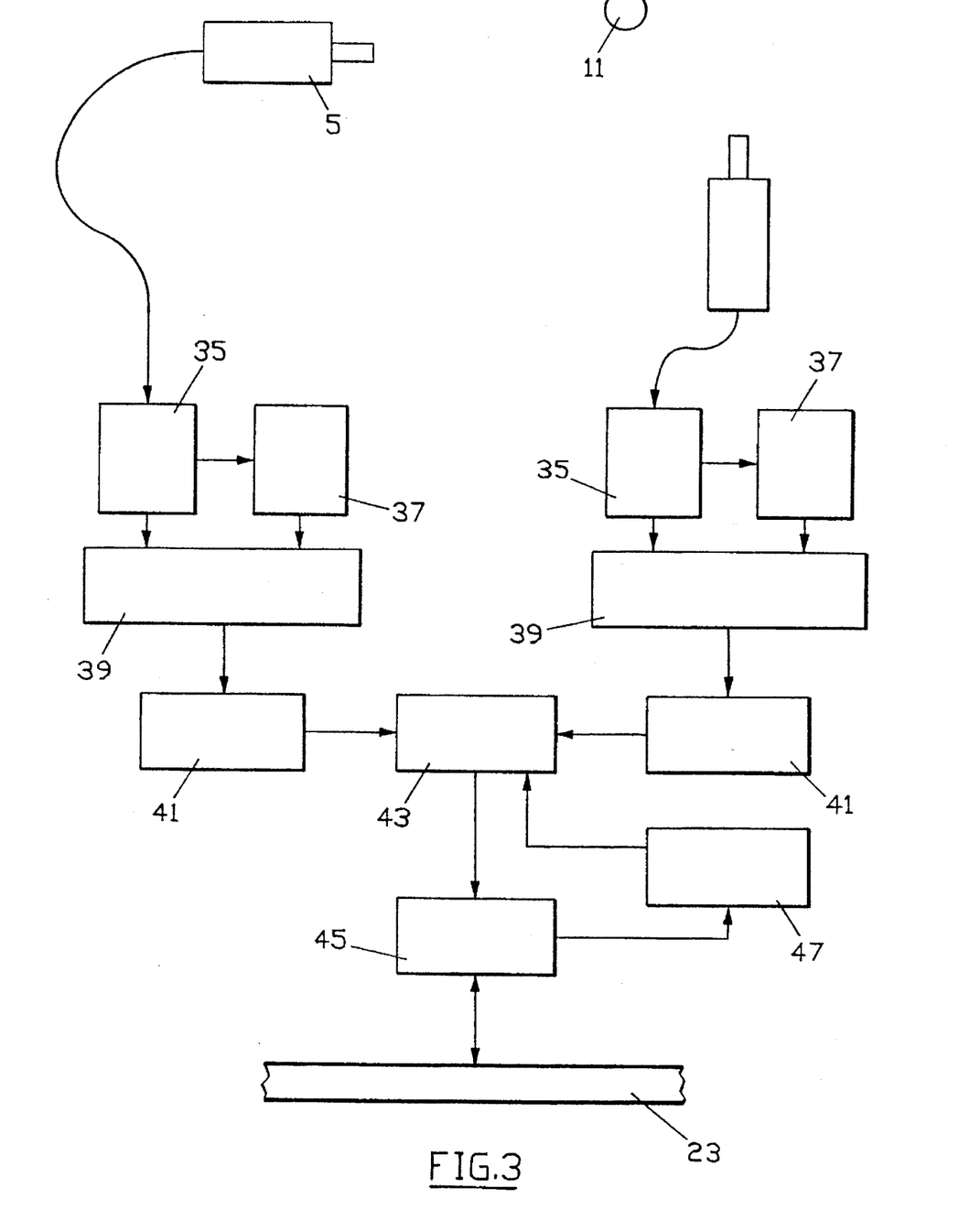
FIG. 3 represents a schematic of the principle of the video acquisition and processing elements of a moving object on a field which are used to locate a ball or similar object.

FIG. 3. The digital video cameras 5 are preferably located slightly elevated in relationship to the field with their optical axes clearly perpendicular to each other. Said cameras have a constant focal length in order to permit easier extraction of the coordinates of the ball based on the digital images which are generated.

Each camera 5 is connected to a first memory card 35 which stores the image recorded by the camera at moment T as well as to a second memory card 37 which stores the preceding image, e.g., the image of moment T-dt. A calculation module 39 substracts the two preceding digital images in order to eliminate any constant components of the images. For every camera 5, the result of the subtraction is submitted to a respective microprocessor-equipped tracking module 41 of known implementation which, through shape recognition based on the images taken at moments T and (T-dt), determines the successive positions of ball 11 making it possible to track the successive positions of the ball as recorded by the corresponding camera. The output of every tracking module 41 in connected to the input of a microprocessor-equipped card 43, which is used in common by both video processing lines using the detection provided by modules 41 to calculate the 3-dimensional coordinates of ball 11 in relationship to the fixed reference associated with the field.

A memory module 47 stores the configuration of cameras 5, e.g., their position within the above mentioned fixed reference.

A dialog module 45 provides the link with main bus 23 in order to allow a dialog with the other elements of the system, in particular to receive the configuration commands for cameras 5 and to transmit the coordinates of ball 11 to central acquisition unit 13. Main bus 23 is a high speed bus of a commonly used type.

One should note that since the digital video cameras must make it possible to locate ball 11 in real time, their image acquisition rate should, in general, be at least 5 Hertz or higher.

Figure 4:
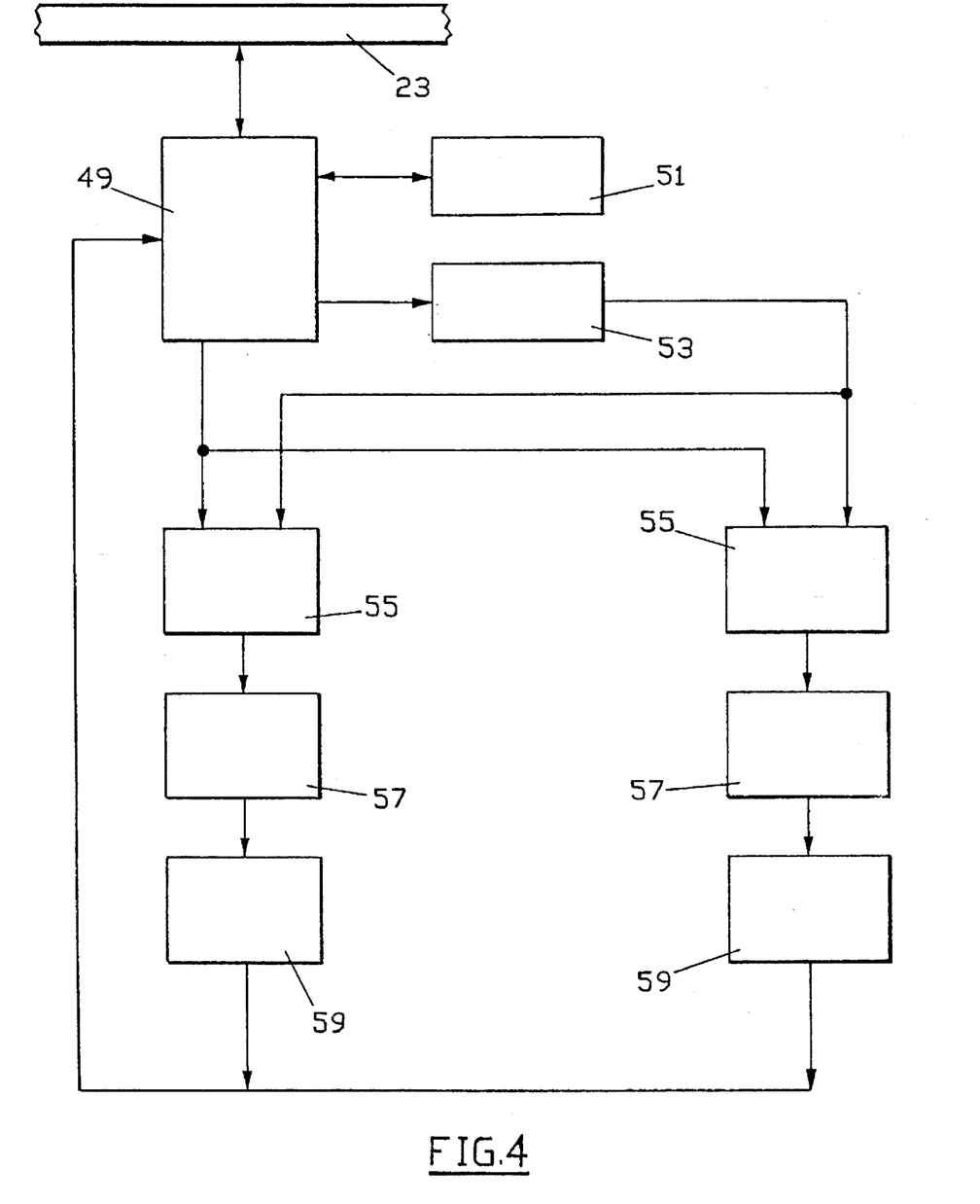
FIG. 4 represents a more detailed view of the section of the system shown in FIG. 1 responsible for determining, through radio-goniometric detection, the position and the trajectory of players on the field.

FIG. 4 represents the central acquisition unit 13 which is responsible for detecting and tracking the position of the different players on the field.

For this purpose, central acquisition unit 13 contains several microprocessor-equipped cards connected on a same support and linked to main dialog bus 23 by means of an adapted dialog module 49 of a known type. This makes it possible to change the number of microprocessor-equipped cards (FIG. 2) which operate in parallel in function of the number of players to be tracked in real time on the field.

Naturally, the number of microprocessor-equipped cards depends on the calculating power of the microprocessors which are used as well as the frequency with which the position of the transmitters carried by the players is acquired.

As a general rule, there are p players to be localized and tracked and p=2 for singles tennis, p=10 for basketball, p=22 for soccer, p=30 for football or rugby.

Module 51 manages the radio frequencies which are allocated to the different players in the game. This module controls the goniometric receivers 19 in order to allocate them in groups of three to the frequencies of the transmitters used by the players in the game since at least three goniometric receivers 19 are required to track a particular player. An increase in the number of goniometric receivers 19 which are allocated to each player will result in increased localization accuracy.

A module 53 responsible for managing the manner in which the antennas are positioned, also of a known type, stores the configuration of the antenna network, e.g., the position of the antennas 17 and their orientation in relationship to the field. The information transmitted by the three goniometric receivers 19 which are allocated to every transmitter carried by a player is obtained by modules 55 from the main dialog bus 23 via dialog module 49. A triangulation module 57 carries out the triangulation calculations based on the three sets of information pertaining to the directions of the transmissions in order to determine the coordinates of the transmitter in question on the game field. For every single player, a digital filtering module 59 digitally filters the trajectory of a given player based on a certain number of last known positions of the corresponding transmitter. This makes it possible to assign a coherent position at moment T to the corresponding player within the game area.

The additional modules 55, 57 and 59, as illustrated, ensure the same function as those which have been described above for a transmitted number p assigned to a player number p.

Figure 5:
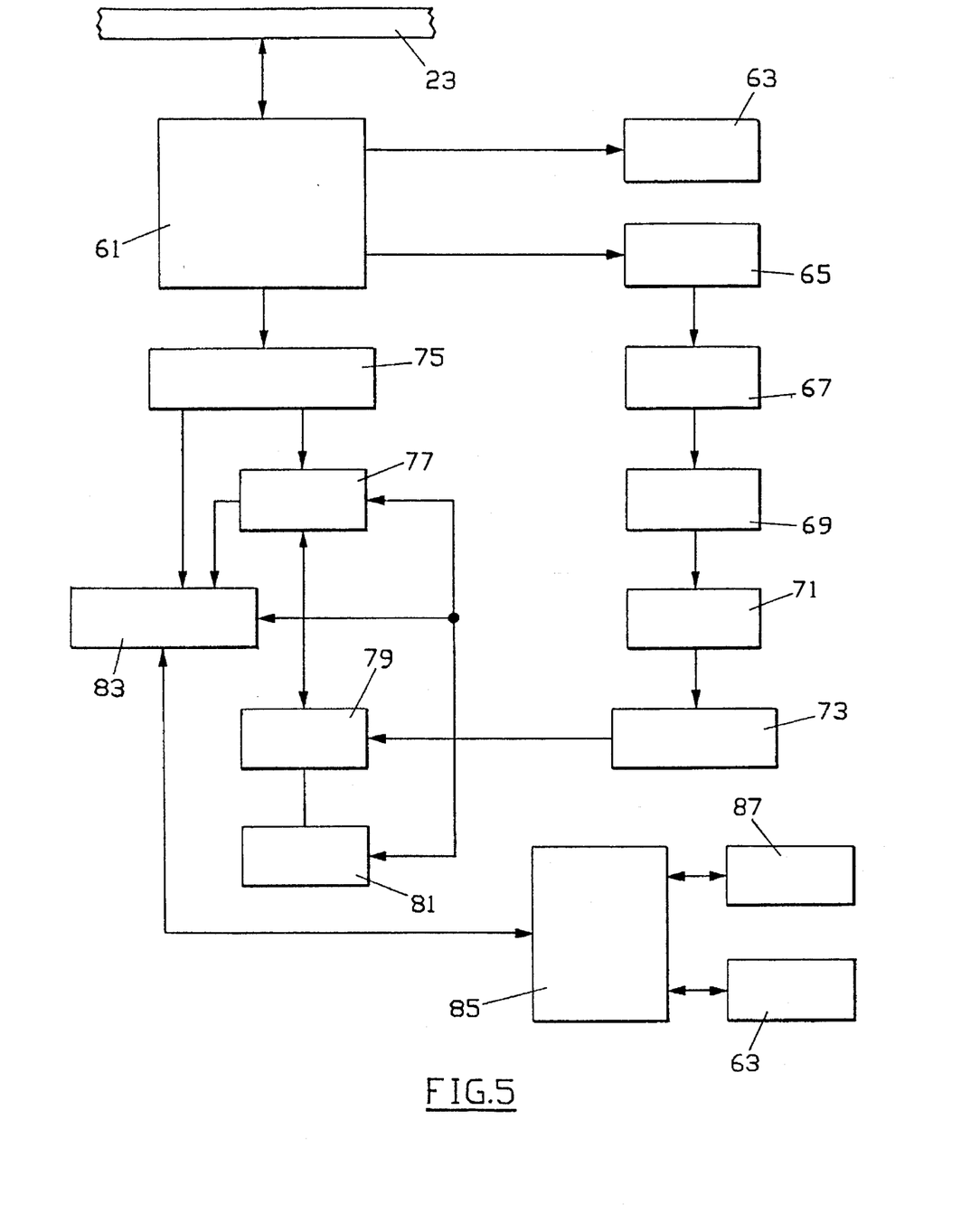
FIG. 5 is a diagram illustrating the principles behind the calculation elements as well as the components which act as interface between the system and its users.

FIG. 5 provides additional detail of a number of software tasks which are carried out by the multimedia computer 15 (FIG. 1). Said multimedia computer 15 includes a sound card, a video card, an interface card 61 with the main dialog bus 23, a communication card 63 used to provide a link with the telephone network or the Ethernet for remote communication with other equivalent multimedia computers 15 which are part of other remote systems 1. Said multimedia computer includes, among others, conventional components which are not shown in FIG. 5 such as, for example, a color monitor, a keyboard, a mouse (or other pointing device), a magnetic media hard drive, an optical disk storage system, etc.

The memory of the multimedia computer 15 contains a number of application programs and routines whose main functions are described below and which are accessed in conventional fashion, for example, by using a mouse to select a routine on a menu which is displayed on the monitor.

A routine 63 allows the selection of the language which is used for man/machine interface as well as the selection of the sport which is played on game field 9. A routine 65 allows the input of the configuration and of the fixed position of antennas 17 and of goniometric receivers 19 as well as of the position of the digital video cameras in the context of the game field in question. A module 67 is included to provide a graphics color representation of the uniforms worn by the different players as well as the input of the names of the competing teams.

A routine 69 questions the user for the elaboration of a game sheet, e.g., the inputting of the names of the players on each team and possibly their replacements.

A routine 71 makes it possible to assign a transmitter's number to each player who appears on the game sheet.

A routine 73 allows the confirmation of the names of the players who are indeed in the game in order to avoid having to monitor the transmitters which correspond to players who are on the sidelines as replacements.

A routine 75 questions central acquisition unit 13 in real time in order to obtain real time position coordinates of both the players and of the ball on the field. Said data are continuously obtained from the main dialog bus 23 and continuously stored onto hard disk 77 of computer 15. In this manner, the successive positions of the players and of the ball will be available for the processing routines used to calculate the requested physical performances.

For this purpose, an appropriate routine 79 calculates the physical performances of the players based on the coordinates of their respective trajectories on the game field. This routine is programmed to calculate at least the total distance traveled by each player, his average speed, his top speed, the number of runs, average acceleration, or any other Value obtained from the instantaneous position data which is representative of the physical performance of the players.

In similar fashion, a routine 81 permits the calculation of statistics which are representative of the interactions of every player with ball 11 based on the position coordinates of every player and the trajectory of the ball also stored on hard disk 77 of computer 15.

It is understood that once the information pertaining to the instantaneous positions of the different players and the ball have been stored and updated on the hard disk, there are no limits to the number of Values which can be calculated by sub-programs, and the professional can determine which numerical Values to be calculated are the most representative of a given sport.

In its preferred implementation, a routine 83 is included for the generation of a synthetic image of the field such as a bird's-eye view, for example. In this synthetic image, the players are represented by their uniforms which show their numbers. It is possible to include real time animation of the synthetic image based on the actual positions of the players at the moment in question. Naturally, the storage of the succession of synthetic images will make it possible to replay game sequences either for broadcast purposes or for sports related educational activities. Using the stored images, it will subsequently also be possible to generate three-dimensional images retracing certain sequences of the game.

For this purpose, a particular implementation of the invention includes, in addition to the modules shown in FIG. 5, a computer-assisted training software module 85 which can be connected to a video management unit 87 for sport-related group education and/or to a network interface 63 for broadcasting or remote training purposes.

Figure 6:
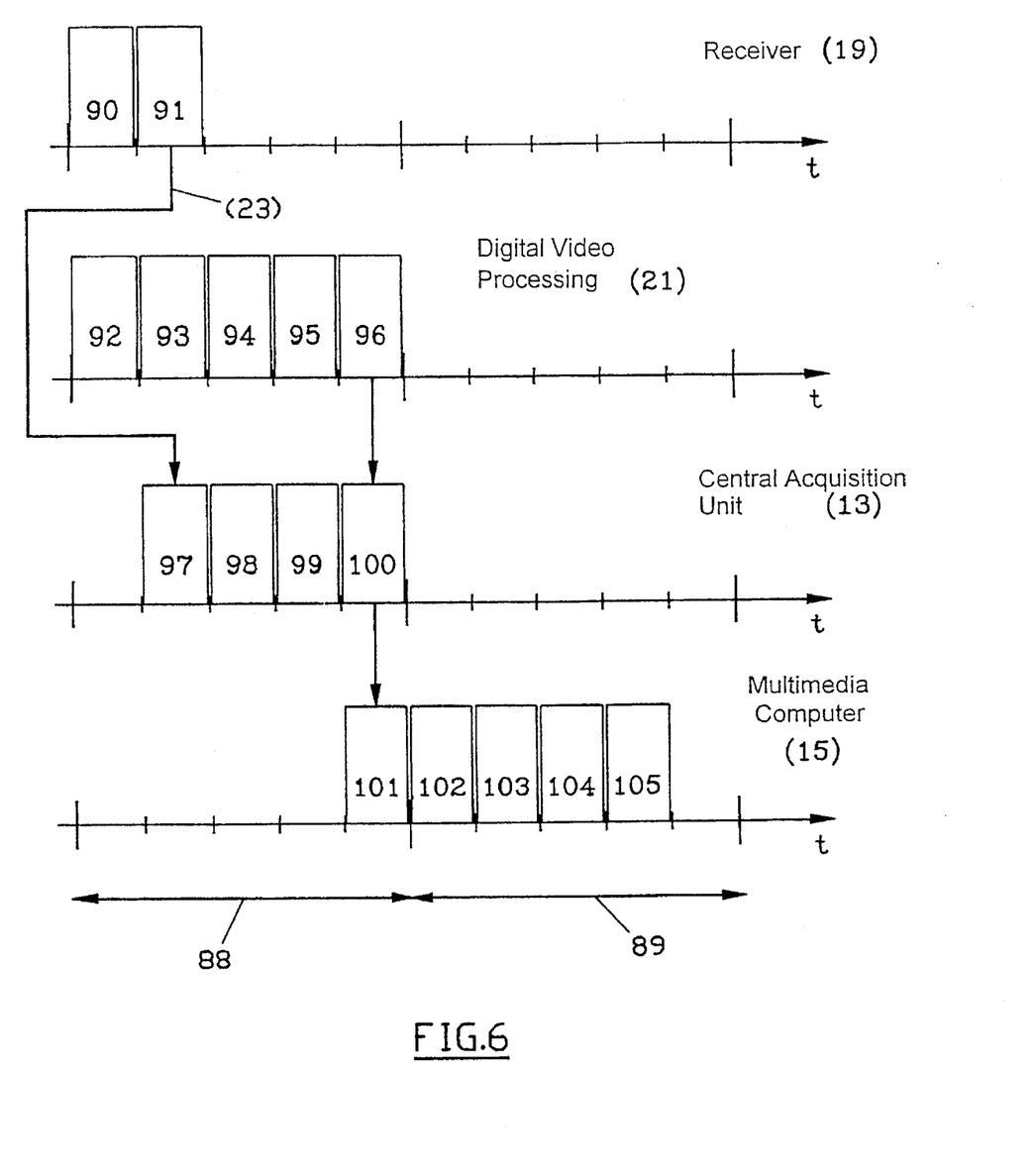
FIG. 6 represents a timing diagram which illustrates the sequencing of the main steps of the process, as invented.

FIG. 6 contains a summary of the different operations carried out by the components of the invented system 1 as a function of time. Numbers 90, 91 represent the tasks carried out at the level of goniometric receiver 19. Numbers 92 through 96 represent the tasks carried out by the digital video processing devices 21; numbers 97 through 100 represent the tasks carried out by the central acquisition unit 13; numbers 101 through 105 represent the tasks carried out by the multimedia computer.

One should note that the above tasks can be divided into two categories. A first category which includes the tasks carried out during phase 88 pertaining to the acquisition of positions of the players and possibly of the ball on the field followed by a phase 89 used for calculating the digital Values associated with the players and/or the ball such as the performances of the players.

Arrows 23 represent the transfer of information which occurs between the tasks on bus of the system. The different tasks are listed as follows:

- 90: determination of the position of a transmitter by a goniometric receiver 19;
- 91: transmission of the preceding position supplied by goniometric receiver 19 to central acquisition unit 13;
- 92: transfer of the instantaneous video image (T-dt) to memory 37;
- 93: acquisition of the video image at moment T into memory 35;
- 94: video processing by modules 39 and 41;
- 95: calculation of the position of the ball by module 43;
- 96: transmission of the preceding position of the ball to central acquisition unit 13;
- 97: reception of the position of the players from the goniometric receivers 19;
- 98: calculation of the position of the transmitters through triangulation;
- 99: filtering of the trajectory of the players carrying the transmitters;
- 100: transmission of the preceding positions of the players and/or the ball to the multimedia computer 15;
- 101: reception of the preceding positions of the players and/or the ball coming from central acquisition unit 13;
- 102: storage of the positions of the players and/or the ball on the hard disk 77 of multimedia computer 15;
- 103: update of the bird's-eye view;
- 104: calculation of the physical performances of the players or other digital Values;
- 105: dialog with the user/operator of the multimedia computer 15. Depending upon the variations of the invention, it is clear that the devices used for the acquisition of the players could also be shape-recognizing video devices providing that sufficiently powerful and reasonably priced calculation and processing devices are available. The advantage would be that players would not need to be encumbered with radio transmitters.

In similar fashion, one could foresee a system which makes use of radio transmissions for all devices used to acquire position including those which detect the position of the ball.

As the different elements of the system are in place and the players are carrying their transmitters, the system localized the players and the ball and tracks them as a function of time which makes it possible to determine useful Values such as cumulative movement or movement as a function of time, speeds, accelerations, energy expenditures, biologic rhythms or others. The Values which are deemed to be useful can be selected by means of a menu which is available at any given time displayed on the screen by a computer program of a known type.

The system described above satisfies the predetermined objectives and makes it possible, among others, to automatically determine the position of the players and of the ball on a game field—in real time (several times per second)—and then to automatically calculate and display a set of values or statistics which are representative of the way that the game is unfolding as well as of the efforts provided by the players.

I claim:

1. A system for real time acquisition and processing of data pertaining to the position and/or physical performance of one or a multitude of persons in motion on a field, in particular athletes in motion on a game field characterized by the fact that it includes:

(a) devices used to acquire in real time the instantaneous individual positions of every person in the field, said devices comprising miniaturized radio frequency transmitters carried by said persons and a set of at least three goniometric receivers tuned successively to the frequency of said transmitters so as to sweep all of the transmitted frequencies as a function of time and to detect several times per second the instantaneous position of every transmitter on the field through triangulation based on the directions from which every transmitter transmits;

(b) devices used for the digital processing associated with said acquisition devices to determine a set of digital Values which are representative of the physical performances of said persons based on said instantaneous position information;

(c) interface devices connected to said digital processing devices responsible for preparing the digital Values which are representative of the physical performances as well as for their graphic representation.

2. A system as set forth in claim 1 characterized by the fact that it furthermore contains devices used to acquire and process the instantaneous position of an object, in particular a ball on a game field with said devices being linked to acquisition device and processing device which are used to acquire and process the position of the athletes in order to determine a set of digital Values which are representative of the interactions between said athletes and said ball.

3. A system as set forth in claim 2 characterized by the fact that said devices used to acquire the instantaneous position of an object are shape-recognizing digital video devices; the instantaneous position of the object being determined through the recognition of the shape of the object at a certain location on the field by means of a comparison with a memorized shape of said object.

4. A system as set forth in claim 1 wherein said interface devices include a multimedia computer which, among others, includes a central processing unit, a connection bus between said central unit and said digital processing and digital video processing devices, a monitor used to display said digital Values aas well as sound devices used to issue audio messages which are associated with said digital Values.

5. A system as set forth in claim 4 characterized by the fact that said multimedia computer includes, among others, memory devices used to store the screen display models which correspond to a multitude of utilization contexts or sports as well as devices used to make selections in memory among said multitude of contexts in order to configure the system in function of a particular context.

6. A system as set forth in claim 5 characterized by the fact that said multimedia computer includes devices used to control and manage the positions of the receivers and the digital video cameras around the field, devices used to manage and edit a set of parameters associated with every team and/or every athlete of a team on the field as well as devices used to prepare and display synthetic images representing a bird's-eye view of the field, the athletes, their movements and their performances.

7. The use of the system as set forth in claim 4, and wherein said digital video acquisition devices include at least two digital video cameras, characterized by the fact that the system includes the following steps which consist of:

(a) positioning said cameras in order to initialize the system;

(b) selecting, on a menu displayed by said computer, the use which will be made of the system in the context of a training session or a game;

(c) using the computer to specify the colors of the uniforms as well as the names of the teams and the players who are present in order to create a game or training session sheet as well as list of replacements;

(d) assigning transmitters to each of the players and, if applicable, assign digital video cameras to the ball;

(e) selecting, during the game or the training session, one or several players on the computer screen, and then selecting, using a menu, one or several digital Values which are representative of the physical performance of said players as well as their graphic representation.

8. A process used to acquire and process data pertaining to one or several players in motion on a game field notably with a ball characterized by the fact that it includes the following steps which consist of:

(a) initializing the system as set forth in claim 1 by assigning a transmitter device to every player on the field as well as a number of corresponding goniometric receivers and by assigning a plurality of cameras to the ball in order to determine the instantaneous position of said players and of said ball;

(b) generating a series of successive images which are representative, respectively, of the instantaneous positions of every player and/or of the ball on the field;

(c) storing said sequences in storage devices which are associated with processing devices;

(d) by means of said processing devices, filtering said sequences in order to obtain, based on the position data, data describing the trajectories of every player and/or of the ball as a function of time;

(e) based on the position and trajectory data, calculating a set of values and/or statistics which are representative of the performances of every player in real time and several times per second; and (f) visualizing said values and/or statistics by means of interface devices.

9. A system for real time acquisition and processing of data pertaining to the position and/or physical performance of one or a multitude of persons in motion on a field, in particular athletes in motion on a game field characterized by the fact that it includes:

(a) devices used to acquire in real time the instantaneous individual positions of every person in the filed;

(b) devices used for the digital processing associated with said acquisition devices to determine a set of digital Values which are representative of the physical performances of said persons based on said instantaneous position information;

(c) interface devices connected to said digital processing devices responsible for preparing the digital Values which are representative of the physical performances as well as for their graphic representation;

(d) devices used to acquire and process the instantaneous position of an object in particular a ball on a game field with said devices being linked to acquisition device and processing device which are used to acquire and process the position of the athletes in order to determine a set of digital Values which are representative of the interactions between said athletes and said ball, said devices used to acquire the instantaneous position of an object being shape-recognizing digital video devices; the instantaneous position of the object being determined through the recognition of the shape of the object at a certain location on the field by means of a comparison with a memorized shape of said object; and said digital video acquisition devices including at least two fixed constant focal length digital video cameras aimed in direction of the field arranged so as to have their optical axes clearly perpendicular to each other; the digital output of each camera being connected to the input of an electronic card used to store the instantaneous digital image and to the input of an electronic card which stores the image which immediately precedes it; the output of each of said memory cards being connected to a module which calculates the instantaneous successive coordinates or the trajectory of an object within a fixed reference associated with the field.

* * * * *